3,798,188
EXPANDABLE POLYMERIC COMPOSITION

Makoto Takizawa, Ageo, Kinzo Miyamoto, Mitaka, Matahiko Asahi, Tokyo, and Megumu Nakamoto, Yokohama, Japan, assignors to Mitsui Toatsu Chemicals, Incorporated, Tokyo, Japan
No Drawing. Filed Oct. 12, 1971, Ser. No. 188,453
Int. Cl. C08j 1/20
U.S. Cl. 260—2.5 R                      8 Claims

ABSTRACT OF THE DISCLOSURE

A polymeric composition composed of a polymeric thermoplastic material and 0.01–20% by weight of a urea derivative of the formula:

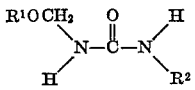

wherein $R^1$ is hydrogen or alkyl of 1–5 carbon atoms and $R^2$ is hydrogen or $-CH_2OR^1$. The urea derivative undergoes condensation with the separation of water and simple alcohols and functions as a chemical blowing agent at an elevated temperature within the range of 100 to 270° C.

BACKGROUND OF THE INVENTION

This invention relates to an expandable polymeric composition employing a novel blowing agent and to a process for the production of shaped articles of cellular polymer therefrom.

In the production of shaped articles, the use of a blowing agent is known to afford shaped articles of a cellular polymer. Known hitherto as such blowing agent are low boiling compounds which vaporize during the shaping of polymers whereby cells are formed (physical blowing agents) and compounds which, under the influence of heat during the shaping of polymers evolve gases, so causing the formation of numerous cells (chemical blowing agents).

The physical blowing agent absorbes latent heat of vaporization on evaporation to gas to permit depression of the interfacial temperature of the resulting cells. Thus, the use of the physical blowing agent improves stability of foams and permits the production of highly foamed articles of an "expansion" of more than 2, sometimes in excess of 3. However, the physical blowing agents are generally liquid having a high vapor pressure and tends to evaporate after mixed with a polymer. In addition, the majority of them is inflammable so that there is a danger of fire in the use of them.

On the other hand, azo compounds are known as the chemical blowing agent which are generally solid and free from defects as seen in the physical blowing agents but they decompose exothermally, so elevating the temperature of the thermoplastic material along with evolving gases such as $N_2$ and CO. Thus, the use of such exothermic chemical blowing agents tends to impair the stability of foam cells and makes it difficult to produce highly foamed articles of an "expansion" of more than 2, contrary to the case of physical blowing agents.

Details of the chemical blowing agents are described, for example, in "Manual for Foaming and Shaping Plastics," pp. 149–154 published by the Technological Association of Synthetic Resins, Japan (Tokyo). The amount of gas evolved is usually 100–280 ml./g. in terms of (volumetric amount of gas evolved at 0° C., 1 atm. in ml.)/(weight of chemical blowing agent in g.).

The "expansion" referred to herein indicates (density of polymers)/(apparent density of shaped article of the polymer), the article of expansion of more than 2, being called "highly foamed" and that of expansion of 1.1–2 being called "low foamed."

A method for preventing the formation of sink mark and hollow portions in a polyolefin molded article caused by shrinkage, which comprises adding a small amount (0.02–1% by weight) of a chemical blowing agent to the polyolefin to form some fine cellular structure in the interior of the shaped article is taught in Japanese patent publn. No. 26,289/64. The expansion in this case is less than 1.1. When a known chemical blowing agent is used for this method, small dimples are formed on the surface of the shaped article, thus damaging appearance of the product.

SUMMARY OF THE INVENTION

It is an object of this invention to provide a polymeric composition capable of attaining a high expansion while maintaining said technical merits in the case of using chemical agents.

It is another object of this invention to provide a polymeric composition which gives in molding of crystalline polyolefins a shaped article devoid of sink mark and hollow portions and having a smooth flat surface.

It is still another object of this invention to provide a polymeric composition containing a chemical blowing agent capable of evolving a large amount of gases.

The polymeric composition of this invention is characterized by containing as blowing agent a urea derivative of the formula:

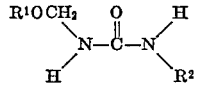

wherein $R^1$ is hydrogen or alkyl of 1–5 carbon atoms and $R^2$ is hydrogen or $-CH_2OR^1$.

EXPLANATION OF THE PREFERABLE EMBODIMENT

We have unexpectedly found that the above mentioned drawbacks of the chemical blowing agents can be overcome by using specific urea derivatives as blowing agent. In accordance with this invention, at least one of urea derivatives of the formula:

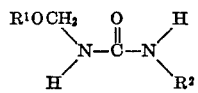

wherein $R^1$ is hydrogen or a linear or branched chain alkyl of 1–5 carbon atoms and $R^2$ is hydrogen or $-CH_2OR^1$, is used as blowing agent.

The urea derivatives used in this invention can be prepared by conventional method, i.e., by effecting addition of formaldehyde to urea to form methylolated urea and subsequent etherification under condensation of the methylolated urea with an alcohol. A description of urea derivatives appears in Beilsteins Handbuch der organischen Chemie, E III 3, pp. 110–114. In this case, the product is not an only compound, but often a mixture of urea, methylolated ureas and alkoxymethylated ureas. The use of such mixture also attains the objects of this invention.

The urea derivatives used in this invention include the following compounds: methylolated ureas such as monomethylolurea and N,N'-dimethylolurea; and alkyl ethers of methylolated ureas such as methoxymethylurea,
ethoxymethylurea,
n-butoxymethylurea,
isobutoxymethylurea,
N-hydroxymethyl-N'-methoxymethylurea,
N,N'-bis(methoxymethyl)urea,
N-hydroxymethyl-N'-ethoxymethylurea,
N,N'-bis(ethoxymethyl)urea,
N,N'-bis(n-propoxymethyl)urea,
N,N'-bis(isopropoxymethyl)urea,
N-hydroxymethyl-N'-n-butoxymethyl-urea,
N,N'-bis(n-butoxymethyl)urea,
N,N'-bis(sec-butoxymethyl)urea,
N-hydroxymethyl-N'-isobutoxymethylurea,
N,N'-bis(isobutoxymethyl)urea, and
N,N'-bis(pentyloxymethyl)urea.

Said urea derivatives are solid powders and are admixed with a polymeric thermoplastic material to form a stable polymeric composition. When the polymeric composition is heated at shaping temperatures above 100° C., the urea derivatives undergo condensation accompanying liberation of water, alcohol or formaldehyde, the liberated water, alcohol or formaldehyde being vaporized by absorption of the latent heat of evaporation whereby the polymer becomes cellular. Substances liberated from a given amount of the urea derivative have a volume as vapor of about 500–700 ml./g. (calculated at 0° C. and one atmosphere) and are composed predominantly of alcohols and water. The condensation reaction is endothermic and absorption of heat by the liberated substances permits depression of the interfacial temperature of the polymer foams and elevation of the viscosity of the foam surface, thus resulting in stabilization of the foams and at the same time enabling a high expansion. The urea-formaldehyde condensate formed by the condensation reaction is compatible with the polymeric thermoplastic material and improves stiffness of the shaped polymeric article.

Alcohols liberated by said condensation reaction have to be vaporized at the shaping temperature of polymer. For this reason, therefore, the number of carbon atoms in the alkyl group represented by $R^1$ in the formula standing for the urea derivatives is limited to 1–5.

The polymeric composition of this invention may also contain conventional additives such as heat stabilizers, UV-protecting agents, coloring agents, fillers, plasticizers, and the like. It is also possible to use jointly a small amount of ammonium chloride, triethanolamine or the like which can promote the condensation reaction of the urea derivatives.

The term polymeric thermoplastic material is intended to include any normally solid polymer or mixture of polymers which is thermoplastic. Suitable polymers are vinyl polymers and include crystalline or rubbery olefin polymers such as polyethylene, polypropylene and ethylene-propylene copolymer as well as polyvinyl chloride, polyvinylidene chloride, ethylene-vinyl acetate copolymer, polystyrene, acrylonitrile-butadiene-styrene terpolymer and ethylene-acrylic acid copolymer.

In mixing of the polymer with the urea derivative, a master batch containing the urea derivative in a concentration higher than that for actual use is first prepared by way of a conventional dry mixing at a temperature low enough to inhibit foaming and then the master batch is worked up in a usual manner. It is also possible that the urea derivative is dissolved or dispersed into a solvent such as water, methanol, ethanol or acetone and particles or powders of the polymer are impregnated or mixed homogeneously with the resulting solution or dispersion.

The amount of the urea derivative employed will vary over a wide range depending on the sort of the urea derivatives, shaping conditions such as shaping temperature, heating time and cooling time and the extent of expansion desired. In general the amount in terms of percent by weight based on the polymeric composition is within 0.5–20% when the expansion is more than 2, 0.1–1.0% when the expansion is 2–1.1 and 0.01–0.4% when the expansion is less than 1.1 and inhibition of shrinkage of the shaped article is desired. A known exothermic chemical blowing agent such as azodicarbonamide may be used jointly with the composition of this invention providing the existence of such materials does not adversely affect the advantage of the invention. In such conjoint use, the foam size of the resulting shaped article will be reduced as compared with the case of using the urea derivative singly.

Any of the conventional shaping techniques for polymeric thermoplastic material, for example, injection, compression and extrusion, can be applied to the polymeric composition of this invention to produce moldings and extrusions. The processing temperature varies according to the sort of polymers and shaping methods but is usually selected from the range of 100–270° C.

This invention will be explained more in detail by way of examples wherein all of parts and percents are shown by weight unless otherwise indicated.

Example 1

100 parts of powders of crystalline propylene-ethylene copolymer having a density of 0.91 g./ml. and a MFI (melt flow index; JIS K6758, 230° C.) of 3.2 were mixed with 1.0 part of N,N'-dimethylolurea. 2.0 grams of the resultant mixture were placed in a test tube having an inside diameter of 15 mm., and previously heated for 30 minutes at 170° C. in an oil bath, then heated at 195° C. for 10 minutes. The mixture was then cooled in water at 20° C. to obtain a foamed product which was pure white and had a uniform distribution of fine cells and an apparent density of 0.37 g./ml.

Example 2

(a) The precedure of Example 1 was repeated except that ethylenevinyl acetate copolymer Elvax 250 (E. I. du Pont de Nemours & Co.) was used as polymer and the period of heating at 195° C. was 5 minutes and 15 minutes. The resultant expanded products evidenced a uniform distribution of fine cells, the apparent densities being 0.32 g./ml. (5 minutes) and 0.33 g./ml. (15 minutes) respectively.

(b) For purposes of comparison, the procedure of Example 2(a) was repeated with the exception that n-heptane was employed as the blowing agent. An expanded product was obtained when the heating time at 195° C. was 5 minutes but only a shrunken and deformed product of an apparent density over 0.8 g./ml. resulted when the heating time at 195° C. was 15 minutes. The reason why shrinkage of the expanded product was not observed in Example 2(a) is understood to be ascribable to the fact that water which functions as blowing gas in this invention has a large capacity of heat absorption.

Example 3

100 parts of granules of crystalline polypropylene having a density of 0.91 g./ml. and MFI of 2.5 were mixed with 0.4 part of N,N'-dimethylolurea. The resulting mixture was charged into a screw-line type 5 oz. injection molding machine and injected into a mold (50° C.) under the following conditions: a cylinder temperature of 250° C., injection pressure of 1000 kg./cm.$^2$ and injection time of about 5 sec. After 45 seconds, the moldings were taken out, the properties of which are shown in Table 1.

The molding is in shape of a rectangular plate with two ribs. The base plate is 40 mm., width, 135 mm., length, and the thickness thereof is varied stepwise as 4 mm. in the range of 0 mm. to 45 mm. from one of the shorter side lines, 3 mm., in 45 mm. to 90 mm., and 2 mm. in 90 mm. to 135 mm. respectively.

Both of the ribs are the same rectangular plates having the dimensions of length of 135 mm., thickness of 2 mm. and height of 5 mm. from the bottom of the base plate. One of the ribs is on one of the longer side lines of the base plate and another is in the distance of 35 mm. from the other parallelling thereto. Most remarkable shrinkage was observed in the central part (A) of the area where the thickness was altered from 4 mm. into 3 mm. and in the central part (B) of the area where the thickness was altered from 3 mm. into 2 mm.

For comparison, moldings were produced in a manner similar to that of this example by using 0.3 part of azodicarbonamide or dinitrosopentamethylenetetramine conventionally used as chemical blowing agent. The properties of these moldings are also shown in Table 1. The foam diameter of the moldings shown in Table 1 was within a range of 0.5 to 1 mm.

Such a high expansion of crystalline polyolefins has never been obtained by using a known conventional chemical blowing agent. When a shaping treatment similar to that of this example was carried out using 2.0 parts and 5.0 parts of azodicarbonamide, the expansion was 1.3 in the former case and 1.1 in the latter case wherein foams were collapsed.

Example 7

100 parts of crystalline propylene-ethylene copolymer granules having a density of 0.90 g./ml. of a MFI of 26 were mixed with 0.4 part of N-hydroxymethyl-N'-methoxymethylolurea by the aid of an intensive mixer (Henschel). The resulting mixture was injected into a mold in a manner similar to that of Example 3 under the following conditions: a cylinder temperature of 260° C., injection pressure of 1000 kg./cm.$^2$ and injection time

TABLE 1

| Experiment number | Example 3 | Comparative Examples | | |
|---|---|---|---|---|
| | | 1 | 2 | 3 |
| Blowing agent (part) | N,N'-dimethylolurea (0.4) | Azodicarbonamide (0.3) | Dinitrosopentamethylenetetramine (0.3) | None. |
| Size of moldings (mm.): | | | | |
| A area | 3.75 | 3.76 | 3.73 | 2.65. |
| B area | 2.73 | 2.74 | 2.53 | 2.23. |
| Appearance of moldings: | | | | |
| Shrinkage | Scarcely found | Scarcely found | Scarcely found | Remarkable. |
| Surface | Smooth | (¹) | (¹) | Smooth. |

¹ There were observed at least 10 small dimples having a diameter of 0.2-2 mm. and a depth of about 0.1 mm.

Example 4

An injection molding operation was carried out similarly as described in Example 3, using a composition which had been obtained by mixing 100 parts of granules of crystalline polypropylene having a density of 0.91 g./ml. and a MFI of 2.5, 1.0 part of titanium dioxide (rutile type), 0.25 part of biurea and 0.05 part of N,N'-dimethylolurea. The properties of the moldings are shown in Table 2. For comparison, the resuults obtained by using 0.3 part of biurea alone as blowing agent are also shown in Table 2 as Comparative Example 4. Although both of the moldings had a fine foam of diameter at most 0.3 mm. and a smooth surface, was less shrinkage was attained by the process of this invention.

TABLE 2

| Experiment number | Example 4 | Comparative Example 4 |
|---|---|---|
| Foaming agent | Biurea (0.25 part), N,N'-dimethylolurea (0.05 part). | Biurea (0.3 part). |
| Size of moldings (mm.): | | |
| A area | 3.74 | 3.52. |
| B area | 2.73 | 2.57. |

Example 5

A mixture of 100 parts of crystalline polypropylene powders having a MFI of 8.0 and 0.4 part of N,N'-dimethylolurea was charged into a 30 mm. extruder maintained at a cylinder temperature of 170° C. and a die temperature of 180° C. and extruded in the form of a round rod having a diameter of about 30 mm. White expanded moldings were thus obtained which had an apparent density of 0.78 g./ml. and were composed substantially of closed foams. When 0.4 part of n-hexane was used for comparison in place of N,N'-dimethylolurea, only poorly expanded molding having an apparent density of 0.87 g./ml. was obtained.

Example 6

100 parts of crystalline polypropylene powders having a density of 0.91 g./ml. and a MFI of 6.0 were mixed with a solution of 2.0 parts of N,N'-bis(methoxymethyl) urea dissolved in 5.0 parts of acetone. The resulting mixture was molded by extrusion at a cylinder of 155° C. to form a white sheet having a thickness of about 4-5 mm. The expansion was 4 and the product was composed of almost closed foams.

of 2 seconds. After 45 seconds, the molded article was taken out, the size of which was 3.78 mm. (A area) and 2.78 mm. (B area). For comparison, the size of the molded article obtained in the absence of the urea derivative was 2.64 mm. (A area) and 2.24 mm. (B area).

Example 8

100 parts of polystyrene beads (Toporex 550, Toyo Polystyrene Kogyo K.K.) was mixed with 2.0 parts of a blend of N,N'-bis(methoxymethyl)urea and N-hydroxymethyl-N'-methoxymethylurea and the mixture was extruded at a cylinder temperature of 160° C. to form a white sheet having a thickness of about 2-4 mm. The expansion was 2.8 and the product was composed of closed foams.

Example 9

100 parts of ethylene-propylene copolymer powders of a MFI of 8.1 were mixed with a solution of 1.0 part of N,N'-bis(isopropoxymethyl)urea dissolved in 5.0 parts of acetone. The resultant mixture was extruded at a cylinder temperature of 160° C. The resultant expanded rod had an apparent density of 0.65 g./ml.

What is claimed is:

1. A polymeric composition comprising a polymeric thermoplastic resin selected from the group consisting of crystalline olefin homopolymers and copolymers of olefins, polystyrene and ethylene-vinyl acetate copolymer admixed with a urea derivative in an amount within the range of 0.01 to 20 percent based on the weight of the polymeric thermoplastic resin, said urea derivative being at least one member selected from the group of compounds of the formula:

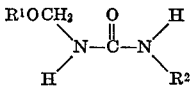

wherein R¹ is hydrogen or alkyl of 1–5 carbon atoms and R² is hydrogen or —CH₂OR¹.

2. A process for the production of a cellular polymeric thermoplastic body which comprises admixing a polymeric thermoplastic resin selected from the group consisting of crystalline olefin homopolymers and copolymers of olefins, polystyrene and ethylene-vinyl acetate copolymer with a urea derivative in an amount within the range of 0.01 to 20 percent based on the weight of the polymeric thermoplastic resin, and heating the mixture to a temperature in excess of the softening point thereof and within the range of 100 to 270° C., said urea derivative being at least one member selected from the group of compounds of the formula

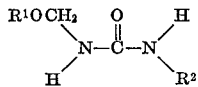

wherein $R^1$ is hydrogen or alkyl of 1–5 carbon atoms and $R^2$ is hydrogen or $-CH_2OR^1$.

3. A composition according to claim 1 wherein the urea derivative is monomethylolurea.

4. A composition according to claim 1 wherein the urea derivative is dimethylolurea.

5. A composition according to claim 1 wherein the urea derivative is N-hydroxymethyl-N'-methoxymethylurea.

6. A composition according to claim 1 wherein the urea derivative is N,N'-bis(methoxymethyl)urea.

7. A composition according to claim 1 wherein the urea derivative is N,N'-bis(ethoxymethyl)urea.

8. A composition according to claim 1 wherein the urea derivative is N,N'-bis(isopropoxymethyl)urea.

References Cited

UNITED STATES PATENTS

| | | | |
|---|---|---|---|
| 2,403,465 | 7/1946 | Pease | 260—854 |
| 2,410,395 | 10/1946 | Smidth | 260—854 |
| 2,436,080 | 2/1948 | Smith | 260—854 |
| 2,376,653 | 5/1945 | Boyer | 260—2.5 F |
| 2,016,199 | 10/1935 | Howald | 260—2.5 F |
| 2,683,696 | 7/1954 | Muller et al. | 260—2.5 D |
| 3,547,839 | 12/1970 | Tocker | 260—2.5 D |
| 3,501,428 | 3/1970 | Marans et al. | 260—2.5 D |
| 3,399,098 | 7/1968 | Omoto et al. | 260—2.5 E |

MURRAY TILLMAN, Primary Examiner

M. FOELAK, Assistant Examiner

U.S. Cl. X.R.

260—2.5 HA, HB, 2.5 F, 2.5 P, 41 R, 41 B, 41.5 R